Aug. 21, 1951 H. C. PAULSEN 2,564,718
TRIMMING MACHINE
Filed May 29, 1948 3 Sheets-Sheet 1

Inventor
Hans C. Paulsen
By his Attorney

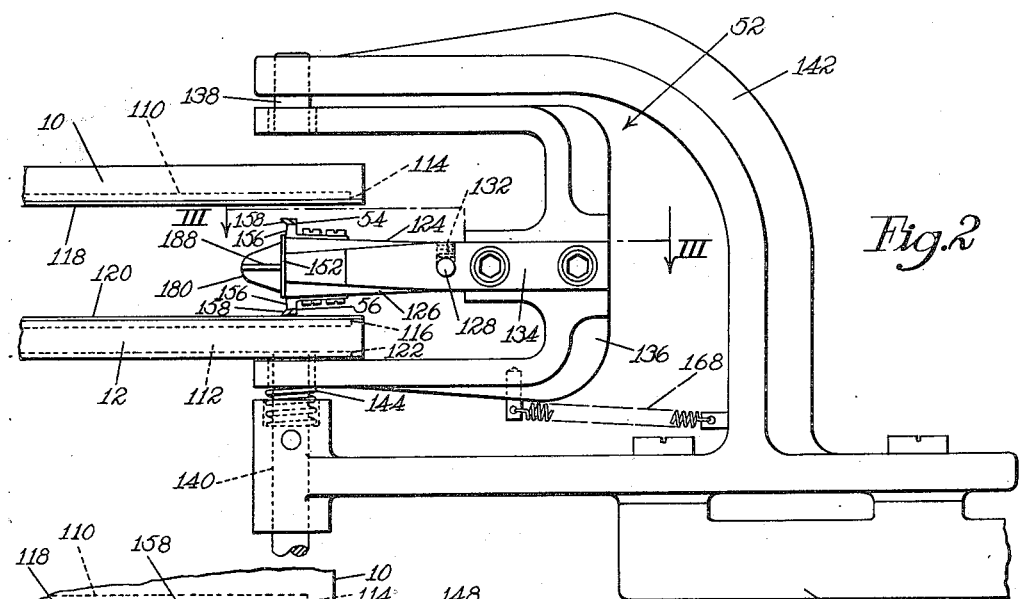
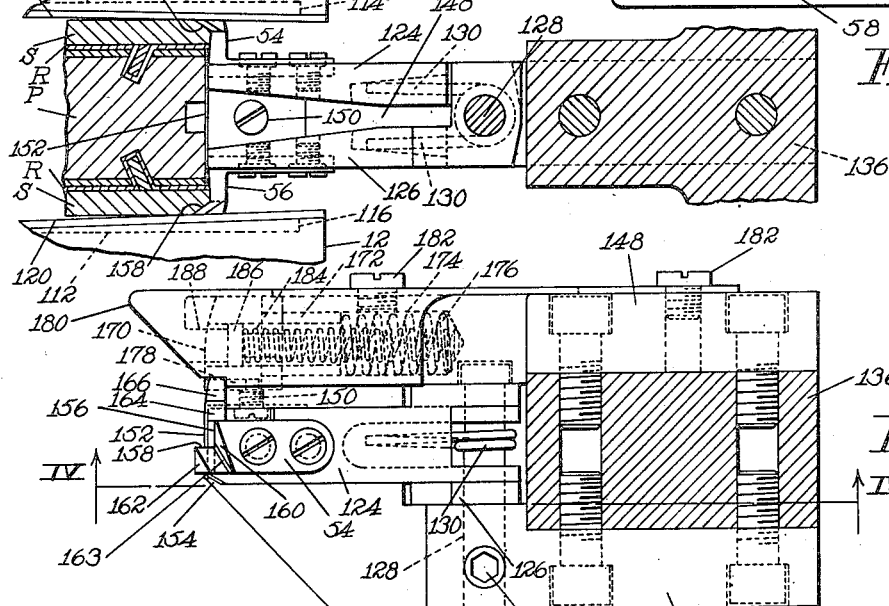
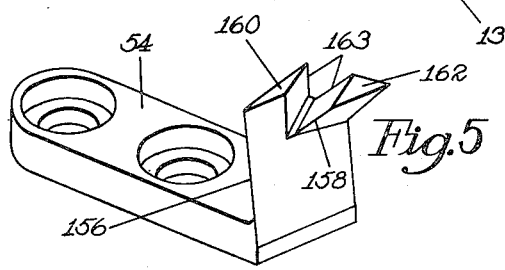

Aug. 21, 1951  H. C. PAULSEN  2,564,718
TRIMMING MACHINE
Filed May 29, 1948  3 Sheets-Sheet 3

Inventor
Hans C. Paulsen
By his Attorney

Patented Aug. 21, 1951

2,564,718

UNITED STATES PATENT OFFICE 2,564,718

TRIMMING MACHINE

Hans C. Paulsen, Medford, Mass., assignor to United Shoe Machinery Corporation, Flemington, N. J., a corporation of New Jersey Application May 29, 1948, Serial No. 30,005

49 Claims. (Cl. 12—17)

This invention relates to trimming machines and more particularly to a machine adapted for simultaneously rounding right and left work pieces, such as a pair of soles, in conformity to a single pattern. By way of example, the invention is disclosed herein with reference to the trimming or rounding of insoles for shoes; but it is to be understood that the invention may have application to the shaping of other kinds of shoe parts, or any other type of work piece, either singly or in pairs.

The type of machine usually employed for rounding soles has a knife which is drawn around a pattern against which a sole is held by a clamp, the knife being under the guidance of the edge of the pattern. One example of a machine of this type is disclosed in United States Letters Patent No. 1,048,511, granted on December 31, 1912, on an application filed in the name of William G. Eaton.

The effectiveness of the cutting action of the knife in this type of machine depends considerably upon the rigidity of the sole material at the line of cut. Any tendency of the sole to creep under the knife pressure, or to spring away from the pattern, impairs the accuracy and smoothness of the rounding cut. Accordingly, it is customary to provide a relatively large number of clamps so that in operating upon a run of sizes of soles a clamp may be selected so near in size to that of the pattern that the unclamped area of any sole inside the line of cut will be small. This practice causes considerable expense because of the number of clamps required, as well as the time lost in changing them.

Soles commonly vary slightly in their thickness with the result that the clamping pressure exerted upon them by the usual rigid type of clamp is concentrated at the thicker parts of the soles, and their relatively thinner parts, if adjacent to the line of cut, are permitted to creep or lift away from the pattern under the pressure of the knife.

In view of the foregoing, it is a general object of the invention to provide an improved rounding machine in which the same clamping means is suitable for use with all sizes of patterns and work pieces, and will effectively hold the work pieces against the pattern continuously along its edge, regardless of variations in the thickness of the work pieces.

To this end, and in accordance with one feature of the invention, the illustrated machine comprises a clamp shaped like the pattern and arranged to overlap its edge, in combination with a knife arranged to cut through the sole against the clamp, the sole-engaging member of the clamp being flexible and deformable into a dished formation in response to the pressure of the clamp against the sole, whereby clamping pressure is applied thereto throughout a marginal area bounded by the edge of the pattern. Preferably, and in accordance with another feature of the invention, the clamping means of the illustrated machine includes a pair of opposed clamps of the type referred to above, in combination with a tool-head having a pair of knives which are arranged simultaneously to trim right and left soles of a pair, each sole being held against one side of the pattern by the clamp which is contiguous thereto.

Any operation upon the edge or margin of a sole or other work piece is furthered as the control or holding of the work is improved and it is, therefore, to be understood that the utility of the clamping means provided by the invention is not limited to its use with a knife.

The sole-engaging member of each clamp, as illustrated herein, consists of a flexible plate or diaphragm which is supported along its margin only and outwardly beyond the edge of the pattern. Accordingly, the plate, when under pressure, is caused to bulge away from the central portion of the sole which it engages, concentrating the clamping pressure on the margin of the sole, and causing it to be applied continuously around the sole because the plate is capable of yielding more opposite to the thicker parts of the sole than it does opposite to the thinner parts thereof.

Invention is also to be recognized in the combination with a clamp for holding a work piece against a pattern in a rounding machine, of a knife which cuts through the sole against the clamp, the knife being characterized by having an end-surface adapted to seat upon the clamp from the cutting edge of the knife rearwardly thereof, thus to provide a bearing surface which prevents the extremity of the knife edge from being dulled as a result of its sliding upon the clamp. In accordance with a further feature of the invention, the illustrated knife is provided with not only a trimming blade for producing the usual rounding cut referred to above, but also a chamfering blade which protrudes obliquely from the trimming blade into engagement with the adjacent clamp whereby a chamfering cut is taken across the edge of the sole simultaneously with the trimming cut. A novel arrangement in the chamfering blade with respect to the trimming blade, which will be described in detail later, provides for the discharge of the chamfering chip between the chamfering and trimming blades with ample clearance; and a sloping surface upon the chamfering blade, which cooperates with the sole to urge the knife in against the clamp, overcomes any tendency of the knife to be separated from the clamp owing to the cutting action of the chamfering blade.

The invention is disclosed herein as concerned with performing the above-mentioned operation upon insoles of the type described in United States Letters Patent No. 2,538,776, granted on January 23, 1951, upon an application of Stanley M. Griswold, while the insoles are held against the sides of a matrix or pattern of the type disclosed in an application for United States Letters Patent Serial No. 717,122, filed December 19, 1946, in the names of Stanley M. Griswold and Hans C. Paulsen. One characteristic of the Griswold insole, which many other types also have, is that it has a reinforcement of duck, or other similar fabric, applied to its ribbed side. It is difficult to cut this reinforcement without causing it to fray, particularly if the reinforcement is not securely fixed to the remainder of the sole.

In view of the foregoing, and in accordance with a further feature of the invention, the tool-head of the illustrated machine has, directly in the advance of each knife, a support which is arranged to engage the side of the sole adjacent to the pattern where it projects from the edge of the pattern into the line of cut of the knife. Each support, therefore, holds the reinforcement against the remainder of the sole where they are operated upon by the knife, and also holds this projecting portion of the sole against the associated clamp. Invention is also to be recognized in the combination with this support structure of a guide member or plow which is arranged to act upon any portions of the reinforcement which may have become separated from the insole to guide such portions of the reinforcement onto the abovementioned supports throughout the transfer of the tool-head about the pattern.

The cutting action of the knives in the illustrated machine is caused to follow the contour of the pattern by mounting the tool-head so that it may swing under the guidance of the edge of the pattern according to changes in its curvature. Such positioning of the tool-head results from a guiding surface thereon being urged inwardly against the edge of the pattern at all times. For the purpose of avoiding any tendency for the knives to cut away from the pattern along a tangent to the desired line of cut, which is the greatest when rounding sharply convex portions of the sole, the knives are positioned in the illustrated machine so that their cutting edges are offset inwardly of the pattern with respect to the axis about which the tool-head swings. This relation gives rise to a moment which tends to swing the tool-head forwardly of the knives whereby they tend to swing inwardly toward the pattern even when passing a sharply convex portion of the pattern.

If this forward swinging tendency of the tool-head should become so great, when the knives encounter hard spots in the soles, as to cause it to rock at the forward end of its guiding surface upon the edge of the pattern, the knives would be moved away from the edge of the pattern, and would fail to trim the soles to the desired shape. In view of the foregoing, and in accordance with another feature of the invention, the tool-head of the illustrated machine comprises a presser member which is arranged to prevent such excessive swinging of the tool-head by engaging the edge of the pattern forwardly of the guiding surface of the tool-head.

The above and various other features of the invention will now be described in greater detail in the following specification, with reference to the drawings illustrating one embodiment of the invention, in which, Fig. 1 is a front elevation of an illustrative machine embodying the invention;

Fig. 2 is a front elevation of the tool-head, illustrating its relation to the clamps when the upper clamp is retracted;

Fig. 3 is an enlarged plan view of a part of the tool-head as viewed from the level of the broken line III—III in Fig. 2;

Fig. 4 is an enlarged sectional elevation of a part of the tool-head shown in operative relation to the work and clamps, the section being taken along the line IV—IV in Fig. 3;

Fig. 5 is an enlarged perspective view of the upper knife as viewed toward its cutting edges, the lower knife being similar thereto;

Figure 1:
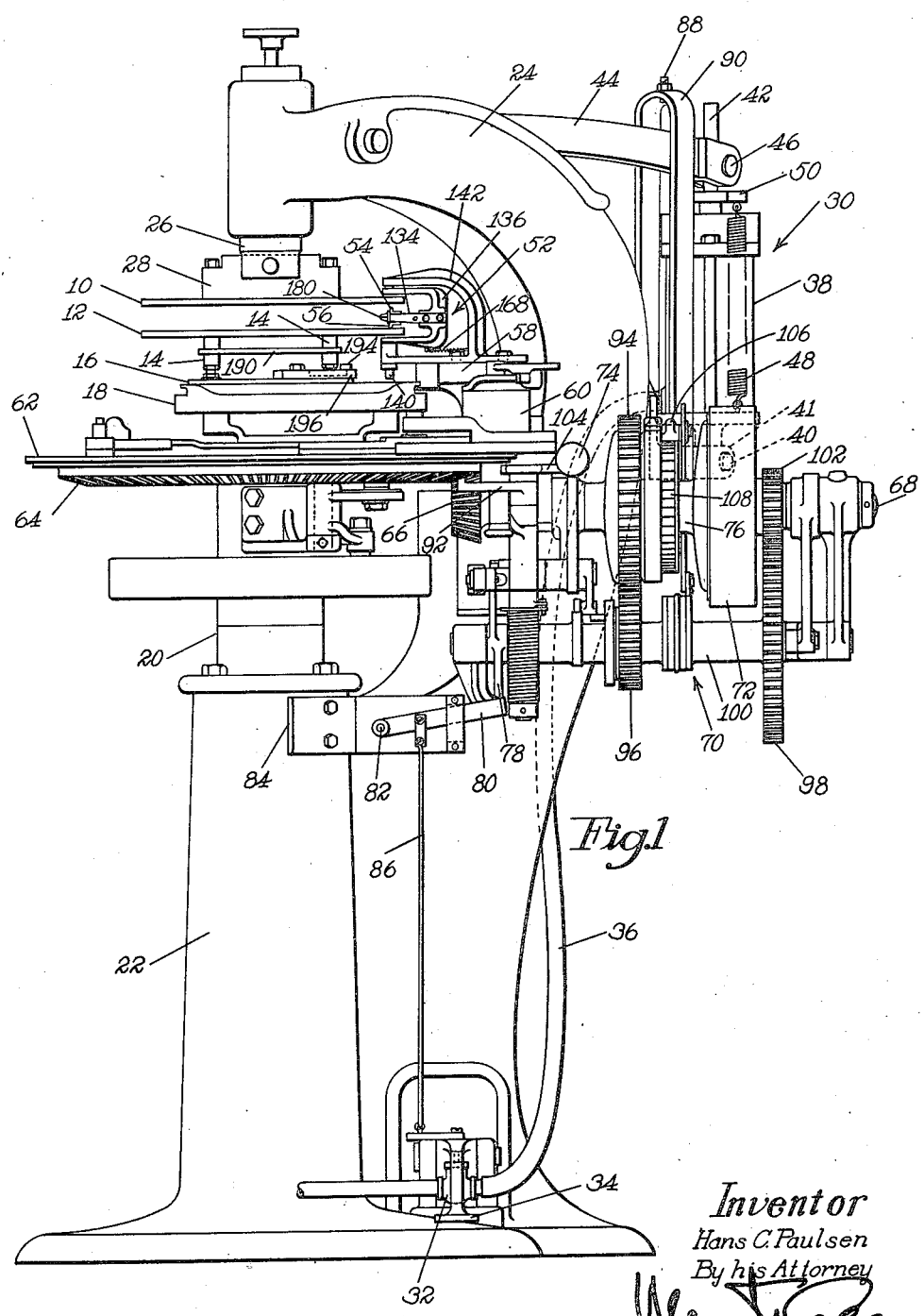

A pattern P with an insole S (Fig. 4) at each side thereof is held, in the illustrated machine, between opposed clamps 10, 12 of novel construction which will be fully described later. The clamps are supported and operated in much the same manner as are the corresponding clamp 13 and pattern 3 in the machine of the above-mentioned Eaton patent, in which parts corresponding to those mentioned below will be indicated by numerals enclosed in parentheses. The lower clamp 12 is supported on a pair of posts 14 (Fig. 1) which extend upwardly from a block 16 carried by a stationary cam 18 (12). This cam is fixed to the upper end of a standard 20 (6) which is mounted vertically upon a base 22 (1), from which there extends upwardly an overhanging arm 24 (2). A slide 26 (15) is mounted for vertical movement in the upper end of the arm 24, and has pivoted to its lower end a block 28 to the lower side of which the upper clamp 10 is fixed.

Clamping pressure is applied to the soles and pattern in the illustrated machine by pneumatically operated mechanism 30 which is under the control of a valve 32 so located as to be operated by the usual treadle 34 (18) of the machine. Upon depressing the treadle, air under pressure is supplied through a pipe 36 to a cylinder 38, which is pivoted at 40 to a lug 41 extending from the arm 24. A piston within the cylinder rises in response to the air pressure and, acting through a rod 42 fixed thereto, swings a lever 44 (16) so as to lower the slide 26 and the upper clamp 10. A pin 46 fixed to the rod 42 connects it with the rear end of the arm 44. When the treadle 34 is released the above-mentioned parts are returned to their original positions by a spring 48 which is stretched between the bottom of the cylinder 38 and a bar 50 which is fixed to the rod 42.

The improved tool-head 52, provided by the invention, comprises a pair of opposed knives 54, 56 which are arranged to cooperate with the clamps 10, 12 respectively, the tool-head being associated with an operating arm 58 which is mounted to swing toward and away from the clamps on a carrier 60 (10) as in the prior Eaton machine. The carrier 60 acts upon the arm 58 to hold the tool-head yieldingly against the edge of the pattern P, and the carrier is rotated to cause the tool-head to travel around the pattern once (and with a slight over-travel) during each cycle of operation of the machine.

The carrier 60 is associated with a table 62 (8), which is mounted to rotate with respect to the standard 20 and carries a ring gear 64 driven by a pinion 66 (21) which is fixed to a drive shaft 68. This drive shaft is a part of a two-speed driving mechanism 70 which is identical, part for part, with the corresponding mechanism of the above-mentioned Eaton machine.

The operation of this driving mechanism will now be described only to the extent necessary for an understanding of the present invention. A driving pulley 72 is mounted on the shaft 68 and is adapted to be driven by a belt from an electric motor, or any other suitable source of power. When an operating lever 74 is depressed, connections between it and a clutch unit 76 keyed to the shaft 68 cause the clutch unit to be frictionally engaged with the pulley 72, whereby the shaft 68 is directly connected with the pulley for high-speed operation.

One part of the above-mentioned connections consists of a lever 78 which is swung forwardly when the operating lever 74 is depressed. Disposed normally in the path of the lever 78 is a safety lever 80 which is pivoted at 82 to a bracket 84 fixed to the base 22. The safety lever is connected by a rod 86 to the treadle 34, and is lowered out of the path of the lever 78 when the treadle is depressed to admit air pressure to the cylinder 38. It will now be apparent that the machine cannot be operated to transfer the tool-head around the pattern unless the clamp 10 has been operated to cause the pattern and soles to be clamped.

A further safety feature of the machine prevents the clamp 10 from being operated so as to damage the tool-head or knives, in case no work has been placed between the clamps before the treadle is operated. For this purpose, the movement of the lever 44 is limited by a stop screw 88 which is threaded in a strap 90, the lower ends of which are fixed to the lug 41.

Resuming now the general description of the operation of the driving mechanism 70, there may be adjustably fixed to the rim of the table 62 (in locations corresponding to the toe and heel ends of the pattern) cams (not shown) which operate a lever 92 to reduce the speed of rotation of the table while the tool-head is moving around the more sharply curved toe and heel portions of the pattern. Such operation of the lever 92 causes the clutch unit 76 to be disengaged from the pulley 72 and to be engaged with a gear 94 which is a part of a low-speed gear train comprising a pinion 96 and gear 98 on the same shaft 100, the gear 98 being arranged to mesh with a pinion 102 which is associated with the pulley 72. After the operating lever 74 has been depressed by the operator it is held in this position by a latch 104 (103). This latch is moved, so as to release the operating lever 74, by a cam (not shown) adjustably mounted on a rim of the table 62 in such a position that the latch is tripped when the table has made slightly more than one complete revolution. At this time forward motion of the table 62 stops, the tool-head having been carried far enough beyond the starting point to insure that it is transferred completely around the pattern while in contact therewith. A short retrograde movement of the table, equal to its over-travel, now takes place. This motion is provided by an oscillating pawl 106 which cooperates with a ratchet 108 on the clutch unit 76 to rotate it backwardly until the table has been returned to its initial starting position when the pawl is lifted out of engagement with the ratchet.

The above-described two-speed operation of the table 62 is optional, depending upon whether the nature of the work requires it. The illustrated tool-head operates satisfactorily on all usual classes of work at high speed only.

The description will now be concerned with the details of construction and operation of the illustrated clamps and tool-head, in which the principal features of the invention reside.

Figure 6:
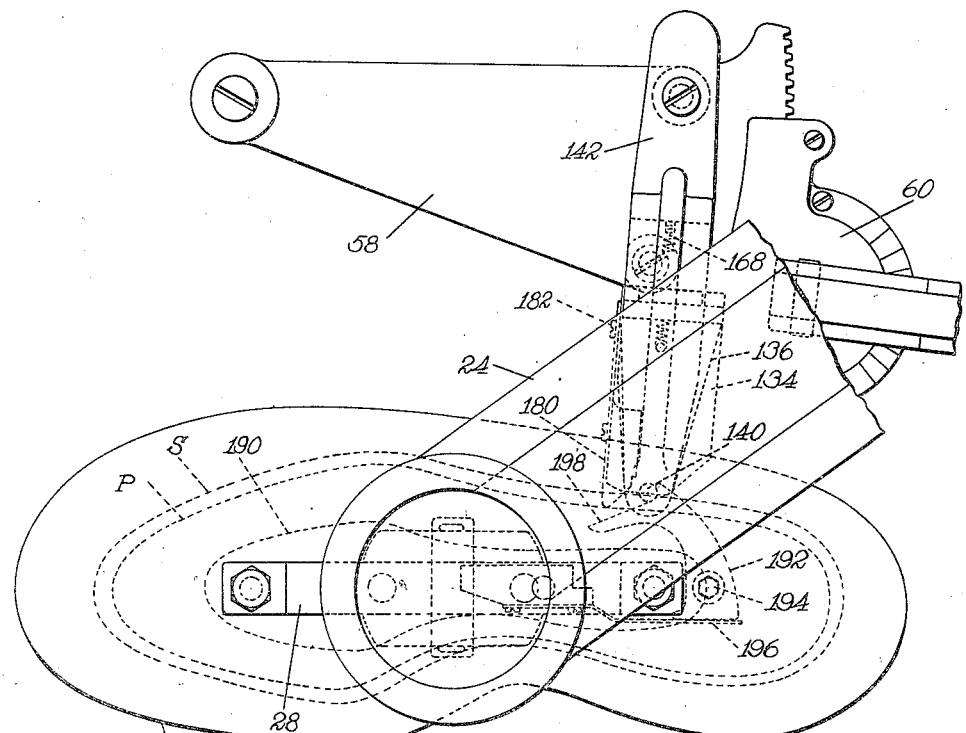
Fig. 6 is a plan view illustrating the relation between the tool-head, clamps, pattern, and work, at the beginning and end of a rounding operation.

The clamps 10 and 12 (Figs. 1 and 2) comprise rigid bases 110, 112, respectively, which are substantially larger than the largest pattern P to be used in the machine, and have a peripheral contour generally similar to the pattern as illustrated in Fig. 6. The inner surfaces of the bases are recessed leaving flanges 114, 116 extending continuously around their rims. To these flanges there are secured flexible spring-steel plates or diaphragms 118, 120, as by brazing or any other suitable method. The exposed surfaces of the plates 118, 120 are chromium plated and polished to provide hard and smooth anti-friction surfaces upon which the knives 54, 56 slide. The lower surface of the base 112 is also recessed to provide another peripheral flange 122, the purpose of which will be explained later.

When clamping pressure is exerted upon the soles in response to lowering of the clamp 10, the plates or diaphragms 118, 120 yield toward their respective bases and assume a dished formation (Fig. 4), the central portions of the plates bulging away from the soles. The clamping pressure is thus concentrated upon marginal areas of the soles bounded by the periphery of the pattern, and the yielding property of the plates permits them to be displaced farther where they engage the thicker portions of the soles than at the thinner portions thereof. Thus it is insured that clamping pressure will be applied to the soles continuously about them and that they will be held firmly against the pattern at all points about its periphery, notwithstanding variations in the thickness of the soles.

The knives 54, 56 are fixed to holders 124, 126 respectively, which are mounted to swing, so that the knives may move toward and away from the clamps transversely of the edge of the pattern, on a horizontal stud 128 (Figs. 3 and 4). The knives are urged apart toward the respective clamps by a spring 130 coiled about the stud, the ends of the spring being seated in recesses formed in the adjacent sides of the holders 124, 126. The stud 128 is secured by a set screw 132 within a hole in a bar 134 which is secured to the midportion of a U-shaped yoke 136. The yoke is arranged to swing freely on pins 138, 140 fixed in the arms of an extension 142 which is fixed to the operating arm 58, and is effectually a part thereof. The yoke 136 and the parts carried thereby are also arranged to move freely axially of the pins 138, 140 and their weight is so counterbalanced by a spring 144 surrounding the pin 140 as to cause the lower knife 56 to rest upon the clamp 12 with only a very light pressure when the upper clamp 10 is retracted.

Opposite to the bar 134, another bar 148 is fixed to the yoke 136, and to the forward end of the bar 148 there is fixed, by means of a screw 150, a shield 152 which provides a guiding surface for the tool-head adapted to engage the edge of the pattern P. This shield has a thickness in the neighborhood of 1/64″ and has a width substantially equal to that of the pattern P, so that its upper and lower edges will support the adjacent surfaces of the soles which overhang the pattern. The rear end of the shield rests against a narrow finger 154 projecting from the outer end of the bar 134.

The knives 54, 56 are mounted closely adjacent to the side of the shield 152 opposite to that which engages the edge of the pattern, each knife having a trimming blade 156 from which protrudes obliquely a chamfering blade 158. These blades have end-surfaces 160, 162, respectively (Fig. 5), disposed in the same plane and so formed that a considerable part of their area extending rearwardly from the cutting edges engages the plates 118, 120 when the clamps are in their operative relation.

It will now be evident that the trimming blade 156 of each of the knives makes a cut close to the edge of the pattern through a sole against the associated clamp, the chip made by this trimming cut being deflected inwardly of the tool-head by the inner side of the trimming blade. At the same time a chamfering cut is taken by the chamfering blade 158 across the edge of the sole adjacent to the associated clamp, the chamfering blade being close behind the trimming blade. The chamfering chip passes through a V-shaped channel 163 which separates the chamfering blade from the trimming blade and is cut into the latter blade to a slight extent, as illustrated in Fig. 5, so that the channel is larger than the chip, providing ample clearance for the chip. Because of the inclination of the surface of the chamfering blade 158 at the channel 163, the cutting action of this blade tends to counteract, to some extent, the effect of the spring 130 which holds each knife against the associated clamp. This tendency is overcome in each knife by forming the surface of each chamfering blade remote from the channel with a slope converging with the sole and pattern (rearwardly of the knife), whereby the trailing portion of this surface presses upon the chamfered surface of the sole and urges the knife toward its associated clamp.

When the pattern with a sole on each side thereof is placed upon the lower clamp 12, preparatory to a rounding operation, the lower knife 56 rests upon the lower clamp, the yoke 136 being slightly elevated from its normal operating position owing to the effect of the spring 130 which urges the knife 56 downwardly with respect to the bar 134 (Fig. 2). When the upper clamp 10 is lowered to apply clamping pressure to the soles, it first engages the upper knife 54, and thereafter both knives are swung together toward each other until full clamping pressure is applied to the soles. A very slight clearance is maintained between the shield 152 and the surfaces of the knives adjacent thereto (Fig. 4) throughout this movement of the knives because their outside surfaces conform substantially to the chord of a short arc, the center of which is at the axis of the stud 128.

The tool-head is centralized with respect to the pattern and between the clamps, not only by the engagement of the edges of the shield 152 with the soles, but also by opposed supports 164 (Figs. 3 and 8) formed on the outer end of the bar 148 immediately in advance of the trimming blades 156. This action of the tool-head is permitted by the vertical sliding of the yoke 136 on the pins 138 and 140, and such sliding of the yoke will occur at any time during a transfer of the tool-head about the pattern when both clamps and the direction of the movement of the extension 142 are not all parallel. These supports have horizontal surfaces which are continuous with the edges of the shield 152, and converging surfaces 166 in advance of the horizontal surfaces. It will now be evident that the supports also hold the portions of the soles which project outwardly from the edge of the pattern, and through which the trimming cut is made, against the clamps 10 and 12, immediately in advance of the trimming blades 156 in order to prevent any movement of the soles away from the clamps while the trimming cuts are being made. This function of the supports is particularly valuable when the soles being operated upon have a reinforcement of duck, or similar material, as in the case of the soles referred to herein, since the reinforcement is flattened and prevented from buckling under the cutting pressure of the trimming blades 156.

The above described cutting action of the knives is directed substantially in the direction of a tangent to the edge of the pattern where it is engaged by the shield 152. This relation results from the yielding pressure of the tool-head against the pattern and its pivotal mounting upon the pins 138, 140, which cause the tool-head to be swung according to the curvature of the edge of the pattern to maintain substantially constant the above described relation of the knife to the edge of the pattern. When making the trimming cut around the more sharply convex portions of the pattern, as at the toe and heel ends thereof, the shield 152 has substantially line contact with the pattern and it is apparent that such contact should occur at the forward portion of the shield in order that the trimming blade will maintain its desired close relation to the edge of the pattern. For this reason, and further to insure that the knife will follow the edge of the pattern around a sharply curved convex portion thereof, the knives are so positioned that the cutting edges of the trimming blades 156 are offset slightly (about $\frac{1}{32}$″), inwardly of the pattern, with respect to the axis of the pins 138, 140 (Fig. 7) about which the tool-head swings. This offset relation of the knives sets up a moment which tends to swing the tool-head forwardly with sufficient force to prevent the knives from cutting away from the desired line of cut (as along a tangent to the edge of the pattern) at a convex portion thereof, without interfering with the proper seating of the shield upon the edge of the pattern where it is straight or concave.

It is evident that the tool-head oscillates back and forth about the pins 138, 140, during a complete trimming cut, as the contour of the pattern changes between a convex and concave form. This oscillating movement of the tool-head is damped by a spring 168 (Fig. 2) connecting the yoke 136 with the extension 142, the spring being arranged to resist movement of the yoke in either direction away from an intermediate position. If, owing to hard spots in the soles, the knives meet such resistance as would cause the tool-head to rock forwardly on the pattern about the leading end of the shield 152, a presser member 170 (Figs. 3 and 8) in advance of the knives and the shield cooperates with the pattern so as to prevent the tool-head from swinging out of the proper relation to the edge of the pattern. This presser member has a tubular shank 172 arranged to slide in a hole 174 formed in the bar 148, and is urged outwardly thereof by a spring 176 which is compressed between the end of the shank 172 and the bottom of the hole. When in its normal position, the surface of the presser member 170 which engages the pattern is flush with the similar surface of the shield 152, the presser member being held in this position by the reduced end of the above-mentioned screw 150 which extends into a groove 178 formed in the rear side of the presser member. The strength of the spring 176 is such as to cushion any forward swinging of the tool-head which brings the presser member 170 into action, and quickly thereafter to return the tool-head to the desired position. If desired, the presser member may be mounted fixedly upon the tool-head. However, the yielding form of presser member is preferred, because the tool-head is better adapted for trimming soles along a sharply concave contour because of this feature.

As mentioned above, the type of sole with which the invention is concerned has a layer of duck R applied to its ribbed side, this being the side of each sole, when being trimmed in the illustrated machine, which is adjacent to the pattern. It sometimes occurs that the duck is wrinkled or curls away from the sole at its margin, so that it tends to cover the edge of the pattern when the sole is applied thereto. Such a condition, if not corrected, would be likely to interfere with the operation of the knives, particularly at the beginning of the rounding cut, when the knives first operate from the edges of the sole blank toward the desired line of cut determined by the edge of the pattern.

Accordingly, in order to provide for the proper guidance of the duck, or other similar reinforcement for the soles, the tool-head of the illustrated machine in provided with a guiding member or plow 180 which is mounted on the forward side of the bar 148 to slide yieldingly into engagement with the edge of the pattern. The plow is held on the bar by screws 182 which are threaded into the bar and extend through elongated slots formed in the plow. This plow has a wedge-shaped sole engaging surface each side of which converges toward the adjacent side of the pattern so as to flatten any curled portion of the reinforcement, and to guide it onto the inclined surface 166 of the support 164, whereby the reinforcement will be properly smoothed and held against the remainder of the sole by the time that the knife acts upon it.

Figures 7, 8:
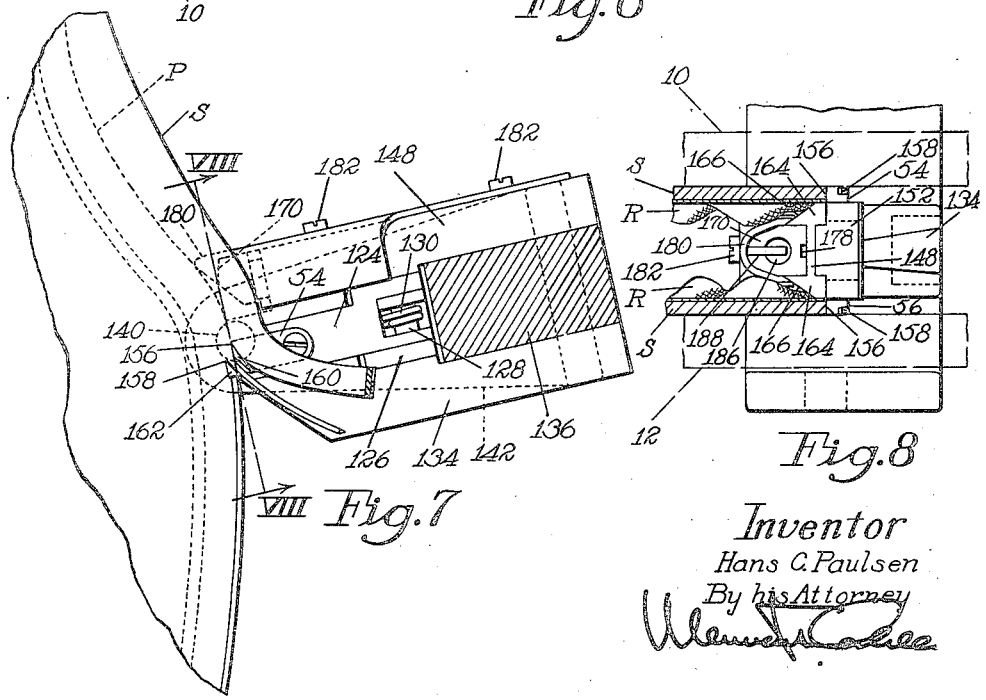
Fig. 7 is a plan view illustrating a rounding and chamfering operation and the relation of the tool-head and pattern when the rounding cut is passing the inner ball line of the pattern.
Fig. 8 is an elevation of the tool-head as viewed outwardly from and normal to the edge of the pattern where it is engaged by the tool-head (as indicated by the line VIII—VIII in Fig. 7).

The plow 180 is also arranged to project appreciably beyond the guiding surfaces of the shield 152 and presser member 170 in order that it may reach around a sharply convex portion of the pattern, as illustrated in Fig. 7, and still remain in contact therewith. With the same purpose in view, the plow is also tapered to a blunt point. The above-mentioned yielding action of the plow is provided by a light spring 184 which is seated on the bottom of the hole 174 and engages a plunger 186 which is arranged to slide freely within the tubular shank of the presser member 170. The plunger 186 is engaged by a web 188 which is fixed to the outer end of the plow.

It is evident that the knives 54, 56 are likely to be damaged should they be moved off the plates 118, 120, since, if this should occur, the knife edges might be dulled by their engagement with the peripheries of the clamps. To insure against excessive inward movement of the knives with respect to the clamps, as well as interference between the extension 142 and the posts 14, a guard 190, shaped like but considerably smaller than the pattern, is mounted on the posts where it may be engaged by the lower end of the extension 142. Movement of the knives outwardly of the clamps off their plates 118, 120 is prevented by the engagement of the pin 140, in the extension 142, with the above-mentioned flange 122 on the lower clamp 12.

Toward the end of a transfer of the tool-head around the pattern the lower end of the pin 140, which projects below the extension 142, slides against a pawl 192 (Fig. 6) which is pivoted at 194 to the above-mentioned block 16. At this time, the pawl is swung inwardly from its position illustrated in Fig. 6, and toward which it is biased by a spring 196 fixed to the block 16. Shortly after the pin 140 moves (toward the left) away from the pawl, the forward motion of the tool-head stops and its retrograde movement begins. Toward the end of this retrograde movement, the pin 140 is directed along a flat surface 198 on the pawl onto a shoulder at the end of this surface, and during the remaining retrograde movement of the tool-head the latter is swung outwardly away from the edge of the pattern as the pawl 192 is swung about its pivot 194. The tool-head is thus positioned at the end of each rounding operation so that the succeeding soles to be trimmed, when placed against the tool-head may be located centrally with respect to the clamps.

The operation of the machine will now be briefly summarized. A pattern with soles applied thereto to be rounded is placed upon the lower clamp 12 with the edges of the soles against the knives 54, 56. Because the plow 180 projects beyond the knives it will be close to or in engagement with the edge of the pattern at this time, and is being thus inserted between the soles will insure that the portions of the sole which overlap the pattern, and particularly the fabric reinforcements R, will be properly separated. The treadle 34 is now depressed to cause clamping pressure to be applied to the soles continuously around their margins. During the movement of the clamp 10 into its operative position, the knives 54, 56 are each swung toward the other against the resistance of the spring 130, the tool-head being bodily lowered axially of the pins 138, 140 so that it is centralized between the clamps.

When the machine is started, by depressing the operating lever 74, the tool-head is urged under the influence of the operating arm 58 toward the pattern P, and during the first part of the trimming cut is guided into engagement with the pattern along the arc about which the pin 140 swings under the control of the pawl 192. Very soon after the cut is first started, the desired relation is established between the soles and the supports 164 so as to insure that the soles will be held against the clamps immediately in advance of the knives. As the shield 152 approaches the edge of the pattern, the plow 180 yields, and upon the engagement of the shield with the pattern the tool-head is swung so that the shield seats flatly upon the edge of the pattern. At this point, slightly in advance of the starting point, the rounding of the soles in conformity to the shape of the pattern begins.

Throughout the transfer of the tool-head around the pattern, the trimming blades 156 cut entirely through the soles against the respective clamps, and simultaneously, the chamfering cuts also are made against the clamps. This result is assured by the pivotal mounting of the knives on the stud 128, and the considerable pressure with which the end-surfaces of the blades are held against the clamps. Since the same spring 130 acts upon both knives, the tool-head may be moved heightwise freely, and the pressures of the knives against the clamps are equalized regardless of changes in the spacing of the clamps which result from variations in the thickness of the soles.

During a complete transfer of the tool-head around the pattern, the tool-head swings under the guidance of the shield 152 according to the change in curvature of the pattern so that the cutting action of the knives is always directed tangentially of the edge of the pattern. Considering the speed with which the tool-head travels around the pattern, the tool-head, in effect, is oscillated back and forth as the curvature of the pattern changes from concave to convex, or vice versa. This oscillation of the tool-head is damped or resisted, to prevent rocking of the shield 152 on the edge of the pattern, by the spring 168.

The offset relation of the trimming blades 156 with respect to the axis of the pins 138, 140 causes a tendency for the tool-head to swing forwardly so that the line of cut of the knives will follow a relatively sharp convex curvature of the pattern. Any excess in this tendency, or in the forward swinging momentum of the tool-head, which would cause the shield 152 to rock away from the pattern about its forward end is counteracted by the engagement of the presser member 170 with the pattern well in advance of the shield.

Throughout the transfer of the tool-head around the pattern, the guide member or plow 180 presses any misplaced portions of the fabric reinforcement R for the soles toward the clamps, and guides them onto the inclined surfaces 166 of the supports 164. The reinforcements, upon passing over the horizontal surfaces of the supports are held against the soles directly in advance of the trimming blades 156 of the knives.

Toward the end of the rounding operation the tool-head passes its original starting position; and has sufficient overtravel beyond this position to continue the rounding cut just beyond the point where the shield 152 first engaged the pattern. A complete rounding cut under the guidance of the pattern is thus made around it. After the forward movement of the tool-head has terminated, it receives the above-described retrograde movement, which, under the control of the pawl 192 returns the tool-head to its original starting position spaced somewhat from the edge of the pattern.

Having described my invention, what I claim as new and desire to secure by Letters Patent of the United States is:

1. In a machine for rounding soles in conformity to a pattern, a clamp cooperating with the pattern to hold a sole thereagainst, said clamp comprising a flexible sole-engaging member supported outwardly from the edge of the pattern and deformable into a dished formation in response to pressure exerted thereby upon the sole whereby the clamping pressure is concentrated at the edge of the pattern, a tool-head movable about the pattern under the guidance of its edge to trim the sole, said tool-head comprising a knife constructed and arranged to make a trimming cut through the sole against said sole-engaging member, and means for holding said knife against said sole-engaging member.

2. In a machine for rounding soles in conformity to a pattern, a clamp cooperating with the pattern to hold a sole thereagainst, said clamp comprising a flexible sole-engaging member supported outwardly from the edge of the pattern and deformable into a dished formation in response to pressure exerted thereby upon the sole whereby the clamping pressure is concentrated at the edge of the pattern, a tool-head for trimming the sole under the guidance of the pattern, said tool-head comprising a trimming knife arranged to cut through the sole and having an end-surface arranged to seat on said sole-engaging member, and means arranged to act upon said knife yieldingly to hold its end-surface against said sole-engaging member, said clamping means and tool-head being relatively movable to transfer the point of operation of the knife about the pattern.

3. In a machine for rounding soles in conformity to a pattern, a clamp cooperating with the pattern to hold a sole thereagainst, said clamp comprising a flexible sole-engaging member supported outwardly from the edge of the pattern and deformable into a dished formation in response to pressure exerted thereby upon the sole whereby the clamping pressure is concentrated at the edge of the pattern, a tool-head movable about the pattern under the guidance of its edge to trim the sole, said tool-head comprising a knife mounted to swing thereon transversely of the edge of the pattern, and means for holding said knife against said sole-engaging member.

4. In a machine for rounding soles in conformity to a pattern, a clamp cooperating with the pattern to hold a sole thereagainst, said clamp comprising a flexible sole-engaging member supported outwardly from the edge of the pattern and deformable into a dished formation in response to pressure exerted thereby upon the sole whereby the clamping pressure is concentrated at the edge of the pattern, and a tool-head movable about the pattern under the guidance of its edge to trim the sole, said tool-head comprising a knife having an end-surface adapted to seat upon said sole-engaging member and being spring-biased into engagement therewith.

5. In a machine for simultaneously rounding right and left soles of a pair, clamping means for holding a sole against each side of a pattern, said clamping means comprising opposed sole-engaging members arranged to overlap the edge of the pattern, and a tool-head for trimming the soles under the guidance of the pattern, said tool-head comprising a pair of knives each of which is constructed and arranged to cut through one of the soles against the adjacent sole-engaging member, said clamping means and tool-head being relatively movable to transfer the point of operation of said knives about the pattern.

6. In a machine for simultaneously rounding right and left soles of a pair into conformity to a pattern to each side of which a sole is fixed, opposed clamps for holding the soles against the pattern, the sole-engaging surface of each of said clamps being arranged to overlap the edge of the pattern, and a tool-head movable about the pattern under the guidance of its edge to trim the soles, said tool-head comprising opposed knives, each knife being constructed and arranged to make a trimming cut through one sole against the associated clamp.

7. In a machine for rounding simultaneously right and left soles of a pair in conformity to a pattern to each side of which a sole is fixed, opposed clamps for holding the soles against the pattern, the sole-engaging surface of each of said clamps being arranged to overlap the edge of the pattern, a tool-head movable about said pattern under the guidance of its edge to trim the soles, said tool-head comprising opposed knives each of which is arranged to trim one sole, each knife being mounted to swing on said tool-head transversely of the edge of said pattern into engagement with the associated clamp, and means for urging said knives into engagement with said clamps.

8. In a machine for simultaneously rounding right and left soles of a pair into conformity to a pattern to each side of which a sole is fixed, opposed clamps for holding the soles against the pattern, each of said clamps comprising a flexible sole-engaging member which is supported outwardly from the edge of the pattern and is arranged to bend in response to pressure exerted upon the sole so as to present a dished surface to the sole, and a tool-head movable about the pattern under the guidance of its edge to trim the soles, said tool-head comprising opposed knives each of which is constructed and arranged to make a trimming cut through one sole against the adjacent sole-engaging member.

9. In a machine for rounding simultaneously right and left soles of a pair in conformity to a pattern to each side of which a sole is fixed, opposed clamps for holding the soles against the pattern, the sole-engaging surface of each of said clamps being arranged to overlap the edge of the pattern, a tool-head movable about said pattern under the guidance of its edge to trim the soles, said tool-head comprising opposed knives, each being arranged to bear against one of said clamps, and means for yieldingly holding said knives against said clamps.

10. In a machine for rounding simultaneously right and left soles of a pair in conformity to a pattern to each side of which a sole is fixed, opposed clamps for holding the soles against the pattern, the sole-engaging surface of each of said clamps being arranged to overlap the edge of the pattern, and a tool-head movable about said pattern under the guidance of its edge to trim the soles, said tool-head comprising opposed knives disposed between said clamps, each knife being spring-biased into engagement with its associated clamp.

11. In a machine for rounding soles in conformity to a pattern, clamping means for holding a sole against the pattern, said means comprising a sole-engaging member arranged to overlap the edge of the pattern, and a tool-head for trimming the sole under the guidance of the pattern, said tool-head comprising a trimming knife and a chamfering knife, each of which has an end-surface arranged to engage said sole-engaging member, said trimming knife being immediately ahead of and spaced from said chamfering knife thereby to provide a clearance space for the chamfering chip, said clamping means and tool-head being relatively movable to transfer the point of operation of the knives about the pattern.

12. In a machine for rounding soles in conformity to a pattern, clamping means for holding a sole against the pattern, said means comprising a sole-engaging member arranged to overlap the edge of the pattern, a tool-head for trimming the sole under the guidance of the pattern, said tool-head comprising a knife mounted and arranged to move transversely of the edge of the pattern into engagement with said sole-engaging member, said knife comprising a trimming blade arranged to cut through the sole against said sole-engaging member and a chamfering blade disposed immediately behind, but spaced from, said trimming blade, and means for yieldingly holding said knife in engagement with said sole-engaging member.

13. In a machine for rounding soles into conformity to a pattern, a clamp cooperating with the pattern to hold a sole thereagainst, said clamp comprising a flexible sole-engaging member arranged to overlap the pattern and being supported along a continuous contour spaced outwardly from the edge of the pattern, a tool-head for trimming the sole under the guidance of the pattern, said tool-head comprising a knife having a trimming blade and a chamfering blade, the ends of which blades bear against said sole-engaging member, said knife being mounted for movement toward and away from said sole-engaging member, and means acting upon said knife yieldingly to hold its blades in engagement with said sole-engaging member.

14. In a machine for simultaneously rounding right and left soles of a pair into conformity to a pattern to each side of which a sole is fixed, opposed clamps for holding the soles against the pattern, each of said clamps comprising a flexible sole-engaging member which is supported outwardly from the edge of the pattern and is arranged to bend in response to pressure exerted thereby upon the sole so as to present a dished surface to the sole, and a tool-head movable about the pattern under the guidance of its edge to trim and chamfer the soles, said tool-head comprising opposed knives, each knife being constructed and arranged to make a trimming cut through one sole against the associated sole-engaging member and simultaneously to make a chamfering cut immediately behind the trimming cut at the edge of the sole contiguous to the said sole-engaging member.

15. In a machine for simultaneously rounding right and left soles of a pair into conformity to a pattern to each side of which a sole is fixed, opposed clamps for holding the soles against the pattern, the sole-engaging surface of each of said clamps being arranged to overlap the edge of the pattern, and a tool-head movable about the pattern under the guidance of its edge to trim the soles, said tool head comprising opposed knives, each being constructed and arranged to make a trimming cut through one sole against the associated clamp and to make a chamfering cut immediately behind said trimming cut at the edge of the sole contiguous to the last-mentioned clamp.

16. In a machine for simultaneously rounding right and left soles of a pair into conformity to a pattern to each side of which a sole is fixed, opposed clamps for holding the soles against the pattern, the sole-engaging surface of each of said clamps being arranged to overlap the edge of the pattern, a tool-head movable about the pattern under the guidance of its edge to trim the soles, said tool-head comprising a pair of knives, each knife having a chamfering blade and in advance thereof a trimming blade, both of said blades being arranged to engage the adjacent clamp, said blades on each knife being separated by a channel adapted to receive the chamfering chip, and means for yieldingly holding each of said knives against its associated clamp.

17. In a machine for rounding soles in conformity to a pattern, clamping means for holding a sole against the pattern, said means comprising a sole-engaging member arranged to overlap the edge of the pattern, and a tool-head for trimming the sole under the guidance of the pattern, said tool-head comprising a knife constructed and arranged to cut through the sole against said sole-engaging member, said tool-head also comprising a support constructed and arranged to hold the portion of the sole which projects beyond the edge of the pattern immediately in advance of the knife against said sole-engaging member, said clamping means and tool-head being relatively movable to transfer the point of operation of the knife about the pattern.

18. In a machine for simultaneously rounding right and left soles of a pair into conformity to a pattern, opposed clamps shaped and arranged to overlap the edge of the pattern and operable to hold a sole against each side thereof, a tool-head for trimming the soles under the guidance of the pattern, said tool-head comprising opposed knives each of which is constructed and arranged to cut through one of the soles against the adjacent clamp, and supports on said tool-head immediately in advance of said knives and spaced by the thickness of the pattern to hold opposite portions of the soles which project beyond the pattern against said clamps, said clamping means and tool-head being relatively movable to transfer the point of operation of said knives about the pattern.

19. In a machine for simultaneously rounding right and left soles of a pair into conformity to a pattern, opposed clamps arranged to overlap the edges of the pattern and to hold a sole against each side thereof, a tool-head for trimming the soles under the guidance of the pattern, said tool-head comprising opposed trimming blades extending transversely of the edge of the pattern and arranged to engage said clamps, said tool-head being mounted to pivot about an axis extending heightwise of said clamps and to move longitudinally of said axis, means for moving said knives away from each other and into engagement with the respective clamps associated therewith, and means arranged to engage opposite portions of the soles in advance of the knives for positioning said tool-head heightwise of said clamps centrally therebetween.

20. In a machine for simultaneously rounding right and left soles of a pair in conformity to a pattern, opposed clamps for holding a sole against each side of the pattern, the sole-engaging surface of each of said clamps being arranged to overlap the edge of the pattern, a tool-head movable about said pattern under the guidance of its edge to trim the soles, said tool-head comprising a pair of knives each having an end-surface arranged to slide against the clamp adjacent thereto, a spring arranged to act upon said knives to hold their end-surfaces against said clamps, said tool-head being freely movable transversely of the edge of the pattern thereby to permit the pressures of said knives against said clamps to be equalized, and means for positioning said tool-head centrally between said clamps.

21. In a machine for simultaneously rounding right and left soles of a pair in conformity to a pattern, opposed clamps shaped and arranged to overlap the edge of the pattern and operable to hold a sole against each side thereof, a tool-head for trimming the soles under the guidance of the pattern, said tool-head comprising opposed knives arranged to cut through the soles against said clamps, an operating arm upon which said tool-head is mounted for movement heightwise of said clamps, said clamps and said arm being relatively movable to cause a transfer of said tool-head about the edge of the pattern, and supports on said tool-head spaced by the thickness of the pattern and arranged to engage opposite portions of the soles projecting beyond the pattern immediately in advance of said knives, whereby said tool-head is positioned heightwise on said arm centrally with respect to said clamps, and the said projecting portions of the soles are held against said clamps.

22. In a machine for rounding soles in conformity to a pattern, clamping means for holding a sole against the pattern, said means comprising a sole-engaging member arranged to overlap the edge of the pattern, a tool-head for trimming the sole under the guidance of the pattern, said tool-head comprising a knife constructed and arranged to cut through the sole against said sole-engaging member and simultaneously to chamfer the trimmed edge of the sole adjacent to said sole-engaging member, and a support on said tool-head for holding the portion of the sole immediately ahead of said knife against said sole-engaging member, said clamping means and tool-head being relatively movable to transfer the point of operation of said knife about the pattern.

23. In a machine for simultaneously rounding right and left soles of a pair into conformity to a pattern, opposed clamps shaped and arranged to overlap the edge of the pattern and operable to hold a sole against each side thereof, a tool-head for trimming the soles under the guidance of the pattern, an operating arm on which said tool-head is mounted to swing parallel to said clamps, said arm being urged toward said clamps and movable thereabout to cause a transfer of said tool-head around the pattern in yielding engagement therewith, said tool-head comprising a shield having edges substantially flush with the sides of the pattern, one side of said shield being arranged to engage the edge of the pattern, opposed knives mounted on said tool-head adjacent to the other side of said shield, and supports on said tool-head for holding opposite portions of the soles which project beyond the pattern against said clamps, the sole-engaging surfaces of said supports being flush with the edges of said shield.

24. In a machine for simultaneously rounding right and left soles of a pair into conformity to a pattern, opposed clamps shaped and arranged to overlap the edge of the pattern and operable to hold a sole against each side thereof, a tool-head for trimming the soles under the guidance of the pattern, said tool-head comprising opposed knives each of which is arranged to cut through one sole against the adjacent clamp, and supports on said tool-head for holding opposite portions of the soles which project beyond the pattern against said clamps in advance of said knives, the sole-engaging surfaces of said supports being substantially flush with the sides of the pattern adjacent to said knives and being arranged to converge forwardly thereof.

25. In a machine for rounding soles in conformity to a pattern, a clamp shaped and arranged to overlap the edge of the pattern and to hold a sole thereagainst, a tool-head movable about the pattern under the guidance of its edge to trim the sole, said tool-head comprising a knife arranged to make a trimming cut through the sole against said clamp, an operating arm upon which said tool-head is mounted to swing about an axis extending heightwise of said clamp, said tool-head also having a guiding surface arranged to engage the edge of the pattern opposite to the knife whereby said tool-head is swung according to the change in curvature of the pattern to maintain constant the relation of the knife to the edge of the pattern, and a presser member arranged to engage the edge of the pattern in advance of said knife and mounted yieldingly upon said tool-head so as to resist swinging of said tool-head upon its said guiding surface forwardly of said knife.

26. In a machine for rounding soles into conformity to a pattern, a clamp arranged to overlap the pattern and to hold a sole thereagainst, a tool-head for trimming the sole under the guidance of the pattern, an operating arm upon which said tool-head is mounted to swing, said arm being urged toward said clamp and movable thereabout to cause a transfer of said tool-head about the pattern in yielding engagement therewith, said tool-head comprising a shield one side of which is arranged to engage the edge of the pattern, a knife mounted closely adjacent to the other side of said shield for movement on said tool-head into engagement with said clamp, said knife being so positioned that its edge is offset inwardly of the edge of the pattern with respect to the axis about which said tool-head swings whereby the cutting action of the knife tends to rock said tool-head forwardly of said knife, and a presser member yieldingly mounted upon said tool-head in advance of said knife and cooperating with the pattern to resist the above-mentioned forward rocking of said tool-head.

27. In a machine for simultaneously rounding right and left soles of a pair into conformity to a pattern, opposed clamps arranged to overlap the edge of the pattern and to hold a sole against each side thereof, a tool-head comprising knives for trimming the soles against said clamps under the guidance of the pattern, said tool-head being mounted to swing about an axis extending heightwise of said clamps and being movable about the pattern in yielding engagement therewith, said tool-head also having a guiding surface arranged to extend from behind the knives forwardly thereof and terminating adjacent to the edges of the knives for angularly positioning said tool-head according to the change in curvature of the pattern, and a member mounted yieldingly on said tool-head and arranged to engage the edge of the pattern in advance of the forward end of said guiding surface.

28. In a machine for simultaneously rounding right and left soles of a pair into conformity to a pattern, opposed clamps arranged to overlap the edge of the pattern and to hold a sole against each side thereof, a tool-head for trimming the soles under the guidance of the pattern, said tool-head being mounted to swing about an axis extending heightwise of said clamps and being movable about the pattern in yielding engagement therewith, a shield mounted on said tool-head and arranged to engage at one side the edge of the pattern, said tool-head comprising opposed knives mounted for movement at the other side of said shield into engagement with said clamps, said shield being arranged to extend from behind said knives forwardly and to terminate adjacent to their cutting edges, said knives also being so positioned that their edges are offset inwardly of the edge of the pattern from the axis about which said tool head swings, whereby the cutting action of said knife tends to swing said tool-head about the forward extremity of said shield, and a plunger mounted yieldingly upon said tool-head in advance of said shield, said plunger being arranged to engage the edge of the pattern and to resist the said swinging movement of said tool-head.

29. In a machine for rounding soles in conformity to a pattern, a clamp shaped and arranged to overlap the edge of the pattern and to hold a sole thereagainst, a tool-head movable about the pattern under the guidance of its edge to trim the sole, said tool-head comprising a knife arranged to make a trimming cut through the sole against the said clamp, an operating arm upon which said tool-head is mounted to swing about an axis extending heightwise of said clamp, said arm being urged toward said clamp and movable thereabout to cause a transfer of said tool-head around the pattern in yielding engagement therewith, said tool-head also having a guiding surface extending from behind the knife forwardly thereof and terminating adjacent to the edge of said knife for angularly positioning said tool-head according to the change in curvature of the pattern, said knife being so positioned that its edge is offset inwardly of the edge of the pattern with respect to the axis about which said tool-head swings, whereby the cutting action of the knife tends to rock said tool-head about the forward extremity of said guiding surface, and a presser member normally flush with said guiding surface and arranged to engage the edge of the pattern, said member being mounted yieldingly upon said tool-head in advance of said knife so as to resist the forward rocking of said tool-head.

30. A knife for use in a machine for rounding soles in conformity to a pattern, said machine having a clamp arranged to overlap the edge of the pattern and to hold a sole thereagainst, said knife being movable in engagement with said clamp about the pattern under the guidance of the edge of the pattern to trim the sole, said knife having a flat end-surface extending rearwardly from the edge of the knife, said knife being mounted and arranged to cause the said end-surface to be seated upon the surface of said clamp which overlaps the pattern.

31. A knife for use in a machine for rounding soles in conformity to a pattern, said machine having a clamp arranged to overlap the edge of the pattern and to hold a sole thereagainst, said knife being movable in engagement with said clamp about the pattern under the guidance thereof to trim and chamfer the sole, said knife comprising a trimming blade from which protrudes obliquely a chamfering blade, said trimming and chamfering blades having end-surfaces disposed in the same plane and arranged to seat upon said clamp.

32. For use in a machine for rounding soles in conformity to a pattern, said machine having a clamp arranged to overlap the edge of the pattern and to hold a sole thereagainst, a knife movable in engagement with said clamp about the pattern under the guidance thereof to trim and chamfer the sole, said knife comprising a trimming blade from which protrudes obliquely a chamfering blade, the cutting edge of the chamfering blade being behind that of said trimming blade, said blades being separated by a channel which is wider than the chamfering chip, each of said blades having an end-surface arranged to seat upon said clamp.

33. For use in a machine for rounding soles in conformity to a pattern, said machine having a clamp arranged to overlap the edge of the pattern and to hold a sole thereagainst, a knife movable in engagement with said clamp about the pattern under the guidance thereof to trim and chamfer the sole, said knife comprising trimming and chamfering blades, each blade being arranged to cut against said clamp, said chamfering blade being disposed behind said trimming blade, the surface of said chamfering blade adjacent to the chamfered surface of the sole being arranged to slope toward the sole rearwardly from the edge of said chamfering blade whereby said knife is urged against said clamp.

34. In a machine for rounding soles in conformity to a pattern, a clamp arranged to hold a sole against the pattern, a tool-head movable about the pattern to trim the sole and having a guiding surface adapted to engage the edge of the pattern, an operating arm upon which said tool-head is mounted to swing and arranged to hold said guiding surface yieldingly against the edge of the pattern whereby said tool-head is oscillated in response to the change in contour of the pattern during a transfer of the tool-head about the pattern, and means for damping the oscillation of said tool-head.

35. In a machine for rounding soles in conformity to a pattern, a clamp arranged to hold a sole against the pattern, a tool-head movable about the pattern to trim the sole, an operating arm upon which said tool-head is mounted to swing and arranged to hold said tool-head against the edge of the pattern, said tool-head being arranged to oscillate on said operating arm in response to the change in contour of the pattern during a transfer of the tool-head about the pattern, and means connecting said operating arm and said tool-head for resisting the swinging movement of said tool-head in either direction away from an intermediate position.

36. In a machine for rounding soles in conformity to a pattern, a clamp arranged to hold a sole against the pattern, a tool-head for trimming the sole under the guidance of the pattern, said tool-head comprising a knife arranged to seat upon said clamp, an operating arm upon which said tool-head is mounted, said arm being yieldingly urged inwardly of said clamp, and means associated with said clamp arranged to cooperate with said arm to limit the range of movement of said knife on said clamp to a marginal area within its periphery.

37. In a machine for rounding soles in conformity to a pattern, a clamp arranged to hold a sole against the pattern, a tool-head for trimming the sole under the guidance of the pattern, said tool-head comprising a knife arranged to seat upon said clamp, an operating arm upon which said tool-head is mounted, said arm being yieldingly urged inwardly of said clamp, and a guard associated with said clamp and arranged to cooperate with said arm to limit movement of said knife inwardly of said clamp.

38. In a machine for rounding soles in conformity to a pattern, a clamp arranged to hold a sole thereagainst, a tool-head for trimming the sole under the guidance of the pattern, said tool-head comprising a knife arranged to seat upon said clamp, an operating arm upon which said tool-head is mounted, said arm being yieldingly urged inwardly of said clamp, and a guard associated with said clamp and arranged to cooperate with said arm to limit movement of said knife inwardly of said clamp, said clamp having a shoulder extending from its rim arranged to cooperate with said arm to prevent said knife from moving off the surface of said clamp outwardly thereof.

39. In a machine for rounding soles in conformity to a pattern, clamping means for holding a sole against the pattern, said means comprising a sole-engaging member arranged to overlap the edge of the pattern, a tool-head for trimming the sole under the guidance of the pattern, said tool-head comprising a knife constructed and arranged to cut through the sole against said sole-engaging member, a support on said tool-head for holding the overlapping portion of the sole in advance of said knife against the pattern, and a guide member mounted on said tool-head in advance of said support for sliding movement into engagement with the edge of the pattern, said guide member having a sole-engaging surface arranged to converge with the sides of the pattern and to guide the sole onto said support, said clamping means and tool-head being relatively movable to transfer the point of operation of said knife about the pattern.

40. In a machine for simultaneously rounding right and left soles of a pair into conformity to a pattern, opposed clamps shaped and arranged to overlap the edge of the pattern and operable to hold a sole against each side thereof, a tool-head for trimming the soles under the guidance of the pattern, said tool-head comprising opposed knives each of which is constructed and arranged to cut through one of the soles against the adjacent clamp, supports on said tool-head for holding the overlapping portions of the soles in advance of said knives against the pattern, a guide member having a wedge-like surface arranged to guide the portions of the soles which project beyond the pattern onto said supports, and means for yieldingly holding said guide member in engagement with the edge of the pattern, said clamping means and tool-head being relatively movable to transfer the point of operation of said knives about the pattern.

41. In a machine for simultaneously rounding right and left soles of a pair in conformity to a pattern, opposed clamps arranged to overlap the edge of the pattern and to hold a sole against each side thereof, a tool-head for trimming the soles under the guidance of the pattern, an operating arm with respect to which said tool-head is mounted to swing parallel to said clamps, said arm being urged toward said clamps and movable thereabout to cause a transfer of said tool-head around the pattern in yielding engagement therewith, said tool-head comprising a shield one side of which engages the edge of the pattern, and opposed knives mounted on said tool-head adjacent to the other side of said shield for movement into engagement with said clamps, each of said knives comprising a trimming blade arranged to cut through one of the soles against the clamp which is contiguous thereto.

42. In a machine for simultaneously rounding right and left soles of a pair in conformity to a pattern, opposed clamps arranged to overlap the edge of the pattern and to hold a sole against each side thereof, a tool-head for trimming the soles under the guidance of the pattern, an operating arm on which said tool-head is mounted to swing parallel to said clamps and to slide toward and away from said clamps, said arm being urged toward said clamps and movable thereabout to cause a transfer of said tool-head around the pattern in yielding engagement therewith, said tool-head also comprising a shield one side of which engages the edge of the pattern, and opposed knives mounted on said tool-head adjacent to the other side of said shield having end-surfaces adapted to seat upon said clamps, said knives being spring-biased into engagement with said clamps.

43. In a machine for simultaneously rounding right and left soles of a pair in conformity to a pattern, opposed clamps arranged to overlap the edge of the pattern and to hold a sole against each side thereof, a tool-head for trimming the soles under the guidance of the pattern, an operating arm with respect to which said tool-head is mounted to swing parallel to said clamps, said arm being urged toward said clamps and movable thereabout to cause a transfer of said tool-head around the pattern in yielding engagement therewith, said tool-head comprising a shield one side of which engages the edge of the pattern, and opposed knives mounted on said tool-head adjacent to the other side of said shield for movement into engagement with said clamps, each of said knives comprising trimming and chamfering blades having end-surfaces arranged to seat on the adjacent clamp, said end-surfaces being separated by a channel adapted to receive the chamfering chip.

44. In a machine for simultaneously rounding right and left soles of a pair in conformity to a pattern, opposed clamps arranged to overlap the edge of the pattern and to hold a sole against each side thereof, a tool-head movable about the pattern under the guidance of its edge to trim the soles, said tool-head comprising a U-shaped yoke arranged to receive said clamps between its sides, an operating arm upon which said yoke is mounted to swing about an axis substantially perpendicular to said clamps, said arm being yieldingly urged toward said clamps and movable thereabout to cause a transfer of the tool-head around the pattern, said tool-head also comprising opposed knives mounted to swing into engagement with said clamps, the cutting edges of said knives being offset from said axis inwardly of said clamps, a shield carried by said tool-head and arranged to engage the edge of the pattern opposite to said knives, and a presser member yieldingly mounted upon said tool-head and arranged to engage the edge of the pattern in advance of said shield.

45. In a machine for operating upon a sole along a path determined by a pattern, a clamp cooperating with the pattern to hold a sole thereagainst, said clamp comprising a yielding sole-engaging member supported outwardly from the edge of the pattern and deformable into a dished formation in response to pressure exerted by the clamp upon the sole whereby clamping pressure is concentrated at the edge of the pattern, a knife which is transferred about the pattern under its guidance, and means on said knife for engaging the surface of said sole-engaging member.

46. In a machine for rounding soles in conformity to a pattern, a clamp cooperating with the pattern to hold a sole thereagainst, said clamp comprising a sole-engaging member supported outwardly from the edge of the pattern and constructed and arranged to bend in response to pressure exerted by the clamp upon the sole so as to present a dished surface to the sole whereby the clamping pressure is concentrated at the edge of the pattern, a knife which is transferred about the pattern under its guidance, and means on said knife for engaging the surface of said sole-engaging member.

47. In a machine for operating upon a sole along a path determined by a pattern, a clamp cooperating with the pattern to hold a sole thereagainst, said clamp comprising a flexible sole-engaging member constructed and arranged to bear upon a marginal area of the sole bounded by the edge of the pattern and to bulge away from the central portion of the sole in response to clamping pressure exerted by the clamp upon the sole, a knife which is transferred about the pattern under its guidance, and means on said knife for engaging the surface of said sole-engaging member.

48. In a machine for rounding soles in conformity to a pattern; a clamp cooperating with said pattern to hold a sole thereagainst; said clamp comprising a yielding sole-engaging plate shaped like, but larger than the pattern, and means for supporting said plate at its rim only whereby the plate is caused to bulge away from the central portion of the sole in response to clamping pressure exerted by the clamp upon the sole, and its clamping pressure is concentrated on a marginal area of the sole bounded by the edge of the pattern; a knife which is transferred about the pattern under its guidance; and means on said knife for engaging the surface of said sole-engaging member.

49. In a machine for rounding soles in conformity to a pattern; a clamp cooperating with the pattern to hold a sole thereagainst; said clamp comprising a flexible sole-engaging diaphragm, and means for supporting said diaphragm along a continuous contour spaced outwardly from the edge of the pattern whereby said diaphragm is caused to bulge away from the central portion of the sole in response to clamping pressure exerted by the clamp upon the sole; a knife which is transferred about the pattern under its guidance; and means on said knife for engaging the surface of said sole-engaging member.

HANS C. PAULSEN.

REFERENCES CITED

The following references are of record in the file of this patent:

UNITED STATES PATENTS

| Number | Name | Date |
|---|---|---|
| 58,992 | Cummings | Oct. 12, 1866 |
| 282,523 | Hoye | Aug. 7, 1883 |
| 318,540 | Breach | May 26, 1885 |
| 391,287 | Wellman | Oct. 16, 1888 |
| 599,722 | Miller | Mar. 1, 1898 |
| 1,447,224 | Ray | Mar. 6, 1923 |